United States Patent
Riley et al.

(10) Patent No.: US 7,566,869 B2
(45) Date of Patent: *Jul. 28, 2009

(54) MEASUREMENT OF WATER-OIL SATURATION USING PULSED NEUTRON INSTRUMENTATION

(75) Inventors: Stephen Riley, Spring, TX (US); Darryl E. Trcka, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/450,497

(22) Filed: Jun. 9, 2006

(65) Prior Publication Data

US 2007/0023626 A1 Feb. 1, 2007

Related U.S. Application Data

(63) Continuation-in-part of application No. 11/189,388, filed on Jul. 26, 2005, and a continuation-in-part of application No. 11/189,455, filed on Jul. 26, 2005, and a continuation-in-part of application No. 11/189,514, filed on Jul. 26, 2005.

(51) Int. Cl.
*G01V 5/10* (2006.01)
(52) U.S. Cl. ............... 250/269.6; 250/269.7; 250/256; 250/262; 250/254
(58) Field of Classification Search .......... 250/269.1, 250/269.6, 269.7; 702/8
See application file for complete search history.

(56) References Cited

U.S. PATENT DOCUMENTS

| | | | | |
|---|---|---|---|---|
| 3,780,301 A | | 12/1973 | Smith, Jr. et al. | 250/83.3 R |
| 4,005,290 A | * | 1/1977 | Allen | 250/266 |
| 5,055,676 A | * | 10/1991 | Roscoe et al. | 250/269.7 |
| 5,105,080 A | * | 4/1992 | Stoller et al. | 250/269.7 |
| 5,374,823 A | | 12/1994 | Odom | 250/269.6 |
| 5,473,939 A | | 12/1995 | Leder et al. | 73/155 |
| 5,525,797 A | | 6/1996 | Moake | 250/269.3 |
| 5,528,030 A | * | 6/1996 | Mickael | 250/269.4 |
| 5,825,024 A | | 10/1998 | Badruzzaman | 250/269.6 |
| 6,207,953 B1 | * | 3/2001 | Wilson | 250/269.4 |

(Continued)

OTHER PUBLICATIONS

Badruzzaman et al.; *Multi-Sensor Through-Casing Density and Saturation Measurement Concepts with a Pulsed Neutron Source: A Modeling Assessment*, SPE 89884, 2004 SPE International Petroleum Conference, Mexico, Nov. 8-9, 2004, pp. 14, 14 Figs.

*Primary Examiner*—David P Porta
*Assistant Examiner*—Yara B Green
(74) *Attorney, Agent, or Firm*—Madan & Sriram, P.C.

(57) ABSTRACT

A method, apparatus, and machine-readable medium for evaluating an earth formation having a fluid mixture including oil and water therein. The earth formation is irradiated with a source and radiation resulting from interaction of the radiation with nuclei is measured at at least two detectors. A fluid zone parameter (FZP) indicative of oil saturation is determined and values of the FZP are established for at least two different values of oil saturation. A value of the oil saturation is estimated using the determined value of the FZP and established values of the FZP. The process may be repeated at a plurality of depths and the determined value of the FZP is displayed at the plurality of depths.

17 Claims, 14 Drawing Sheets

U.S. PATENT DOCUMENTS

| | | | |
|---|---|---|---|
| 6,936,812 B2 * | 8/2005 | Odom et al. | 250/269.5 |
| 2002/0036260 A1 | 3/2002 | Adolph | 250/269.1 |
| 2005/0139759 A1 * | 6/2005 | Pitts et al. | 250/269.6 |
| 2006/0243898 A1 * | 11/2006 | Gilchrist | 250/269.7 |

* cited by examiner

MEASUREMENT OF WATER-OIL SATURATION USING PULSED NEUTRON INSTRUMENTATION

CROSS-REFERENCES TO RELATED APPLICATIONS

This application is a continuation in part of U.S. patent application Ser. No. 11/189,388, U.S. patent application Ser. No. 11/189,455 and U.S. patent application Ser. No. 11/189,514, all filed on Jul. 26, 2005

BACKGROUND OF THE INVENTION

This invention relates generally to oil and gas well logging tools. More particularly, this invention relates to a tool for measuring gas saturation and gas pressure of earth formations through the use of gamma rays generated by a pulsed neutron source. This invention may be used in cased holes as well as open holes.

In petroleum and hydrocarbon production, there is considerable commercial value in the recovery of gas from reservoirs. Over the course of production of gas, there is an increasing influx of water into the reservoir. This may be due to natural causes or it may be, in the case of secondary recovery operations, the result of injection of water into the reservoir. The production of gas thus leads to a decrease in gas saturation of the reservoir. In addition, due to the fact that reservoirs by their very nature comprise permeable earth formations within impermeable strata, production of gas leads to a decrease of gas pressure. The decrease of gas pressure in turn affects the flow pattern of reservoir fluids. Knowledge of the gas pressure is also very helpful in reservoir development. Knowledge of gas saturation is also important in enhanced oil recovery programs (EOR) where a gas is injected into an injection well and used to direct the flow of oil from the reservoir into a production well.

A basic methodology underlying the determination of gas saturation and/or gas pressure is that of density determination. One approach involves detection of gamma radiation produced in the formation in response to a high-energy neutron source, referred to as induced gamma ray logging. When the neutron source is pulsed, gamma rays are produced by one of two reactions. The first is inelastic scattering of fast neutrons (neutrons with energies above about one MeV or within about one order of magnitude). The second mechanism is from capture of epithermal neutrons (neutrons with energy of about one eV). The third is from capture of thermal neutrons (neutrons with energy of about 0.025 eV). The fast-neutron lifetimes are very small (a few microseconds) such that during the source pulse a mixed-energy neutron field exists. Shortly after the burst, all neutrons slow down to a thermal energy level and these thermal neutrons wander about until being captured, with a lifetime in the hundreds of microseconds. Gamma rays from inelastic scattering are produced in close proximity to the accelerator, and gamma rays from thermal capture are dispersed farther from the accelerator (up to tens of centimeters). The number of capture gamma rays is strongly influenced by the amount of hydrogen and the thermal neutron capture cross section of the formation. The number of gamma rays produced from inelastic scattering is less dependent on these quantities, and a measurement of such gamma rays is more directly related to the formation density. Use of a pulsed neutron source allows capture gamma rays to be separated from inelastic gamma rays, giving a better estimate of density.

U.S. Pat. No. 3,780,301 to Smith Jr. et al. discloses a method and apparatus for determination of gas saturation using a logging tool deployed in an open borehole. A pulsed neutron source produces pulses of neutrons with energy of about 14 MeV. A single gamma ray detector measures counts of inelastic gamma rays resulting from interaction of the neutrons with nuclei in the formation. Specifically, counts are made in energy bands corresponding to C, O, Si and Ca. By comparing the Si/Ca and C/O ratios in these regions to the Si/Ca and C/O ratios for a known water sand, the relative abundance of limestone in the low hydrogen content formations may be estimated thus distinguishing gas zones from water saturated low porosity limestone.

When the wellbore in which the tool is run is an uncased reservoir, the tool is able to contact the subterranean formation itself. However, once a well has been cased, there exists a layer of steel and concrete between the interior of the wellbore where the tool is located and the formation itself. The well casing makes it difficult for signals to pass between the tool and the reservoir and visa versa. In addition, the cement can confuse the measurement of formation properties.

Formation density measurements have traditionally been made using two gamma ray detectors. In open hole situations, density estimates $\rho_{SS}$ and $\rho_{LS}$ made by the near and far detectors are used to get a corrected density estimate using the spine and rib method which may be represented by the equation $$\rho - \rho_{LS} = \Delta\rho = f(\rho_{LS} - \rho_{SS}) \quad (1),$$

where $f(\cdot)$ is a function that is nonlinear, depends upon the standoff of the tool or the amount of mud cake between the tool and formation, and determined by a calibration process. This dual detector arrangement is able to compensate for standoff (in MWD applications) and mudcake thickness (in wireline applications). When used with a pulsed neutron source, correction also has to be made for variations in the source intensity, so that a two detector arrangement only gives a single estimate of density based on, for example, a ratio of the outputs of the two detectors.

For measurements made in cased holes, as noted above, there is an additional complication due to the presence of casing and cement. In order to probe the formation, neutrons must exit the tool, pass through the casing and cement and scatter, or be captured in the formation before the resulting gamma rays pass passing back through the cement and the casing to finally reenter the tool to be detected. Thus, instead of just a mudcake correction (for open hole wireline) or a standoff correction (for MWD), a cased hole density tool must be able to correct or compensate for the cement and casing, an effect which is greater than that of the mudcake. U.S. Pat. No. 5,525,797 to Moake discloses the use of a three detector tool using a chemical gamma ray source which corrects for the effects of casing. A drawback of the Moake device is the need for a relatively high energy chemical source (a safety issue) and the fact that gamma ray energies are measured (instead of count rates). In addition, it is not possible to separate inelastic gamma rays from capture gamma rays.

U.S. Pat. No. 5,825,024 to Badruzzaman discloses an apparatus for measuring the density of a subterranean formation from within a wellbore, especially a cased wellbore. The apparatus has an energy source configured to generate 14 MeV neutrons in pulses of 20 microseconds or less. The apparatus has at least three detectors for detecting gamma rays which are produced as a result of the neutron pulse. The detectors and energy source are aligned along a central axis with the energy source being at one end. Shielding is disposed between each of the three detectors and between the end detector and the energy source adjacent to it. The detectors are configured to measure gamma rays below 700 KeV and generate a signal in response thereto. The signals may then be compared to predetermined characteristic signals or computer simulations to determine the density, and hence porosity, of the formation.

Badruzzaman et al. (SPE89884) discuss the use of a four sensor arrangement for through-casing density measurements with a pulsed neutron source. These included a pseudo-density determination, C/O measurements for oil saturation determination, and pulsed neutron capture (PNC) cross section measurements for water and steam saturation.

None of the prior art recognizes the inter-relation between the effects of gas saturation and gas pressure on the measurements made by a nuclear logging tool. The present invention recognizes the inter-relation and represents a comprehensive approach to the determination of reservoir characteristics through casing.

SUMMARY OF THE INVENTION

One embodiment of the invention is a method of evaluating an earth formation having a fluid mixture including oil and water therein. The earth formation is irradiated with a source. Radiation resulting from interaction of the radiation with nuclei is measured at at least two detectors. A fluid zone parameter (FZP) is determined at at least one depth from the measurements. The FZP is indicative of the oil saturation. Values of the FZP are established for at least two different values of oil saturation. A value of the oil saturation is estimated using the determined value of the FZP and the established values of the FZP. The borehole may be a cased borehole. The source of irradiation may be a pulsed neutron source. The measured radiation may include gamma rays resulting from neutron capture. The FZP may be related to a ratio of measurements made by one of the at least two detectors and measurements made by another one of the at least two detectors. Establishing the values of the FZP for the two different values of oil saturation may be based on using a formation mineralogy, a formation porosity, a tool response characteristic, a formation fluid density, a borehole fluid density, a casing diameter and an equation of state. The established values may be based on a Monte Carlo simulation. The process may be repeated at a plurality of depths and the determined value of the FZP is displayed at the plurality of depths. Estimation of the oil saturation may be based on linear interpolation, nonlinear interpolation, linear extrapolation and/or nonlinear extrapolation.

Another embodiment of the invention is an apparatus for evaluating an earth formation including water and fluid. The apparatus includes a source of radiation conveyed in the earth formation. The source irradiates the earth formation. At least two detectors produce signals indicative of results of the interaction of the irradiation with nuclei in the formation. A processor determines from the signals, at at least one depth, an estimate of a fluid zone parameter (FZP) indicative of oil saturation. The processor establishes values of the FZP for at least two different values of oil saturation and estimates from the determined value of the FZP and the at least two established values of the FZP a value of oil saturation. The apparatus may be conveyed in a cased borehole. The source of radiation may be a pulsed neutron source. The interactions may include neutron capture. The FZP is related to a ratio of measurements made by one of the at least two detectors and measurements made by another of the at least two detectors.

The FZP may be established for oil saturation of 0.0 and 1.0. The processor may establish the values of the FZP using a formation mineralogy, a formation porosity, a tool response characteristic, a formation fluid density, a borehole fluid density, a borehole diameter, a casing diameter, and an equation of state. The establishment may be done using Monte Carlo simulation. The apparatus may include a conveyance device such as a wireline and a slickline. The two detectors may be responsive to gamma radiation.

Another embodiment of the invention is a machine readable medium for use with an apparatus for evaluating an earth formation having a fluid mixture of oil and water. The apparatus includes a source of radiation conveyed in a borehole in the earth formation, the source irradiating the formation. The apparatus also includes two detectors which produce signals indicative or results of the irradiation with nuclei. The medium includes instructions which enable a processor to determine from the signals a value of a fluid zone parameter (FZP) indicative of an oil saturation at at least one depth in the borehole. The instructions further enable the processor to establish values of the FZP for at least two different values of oil saturation, and to estimate from the determined value of the FZP and the at least two established values of the FZP a value of oil saturation. The medium may include a ROM, an EPROM, an EEPROM, a Flash Memory, and an optical disk

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
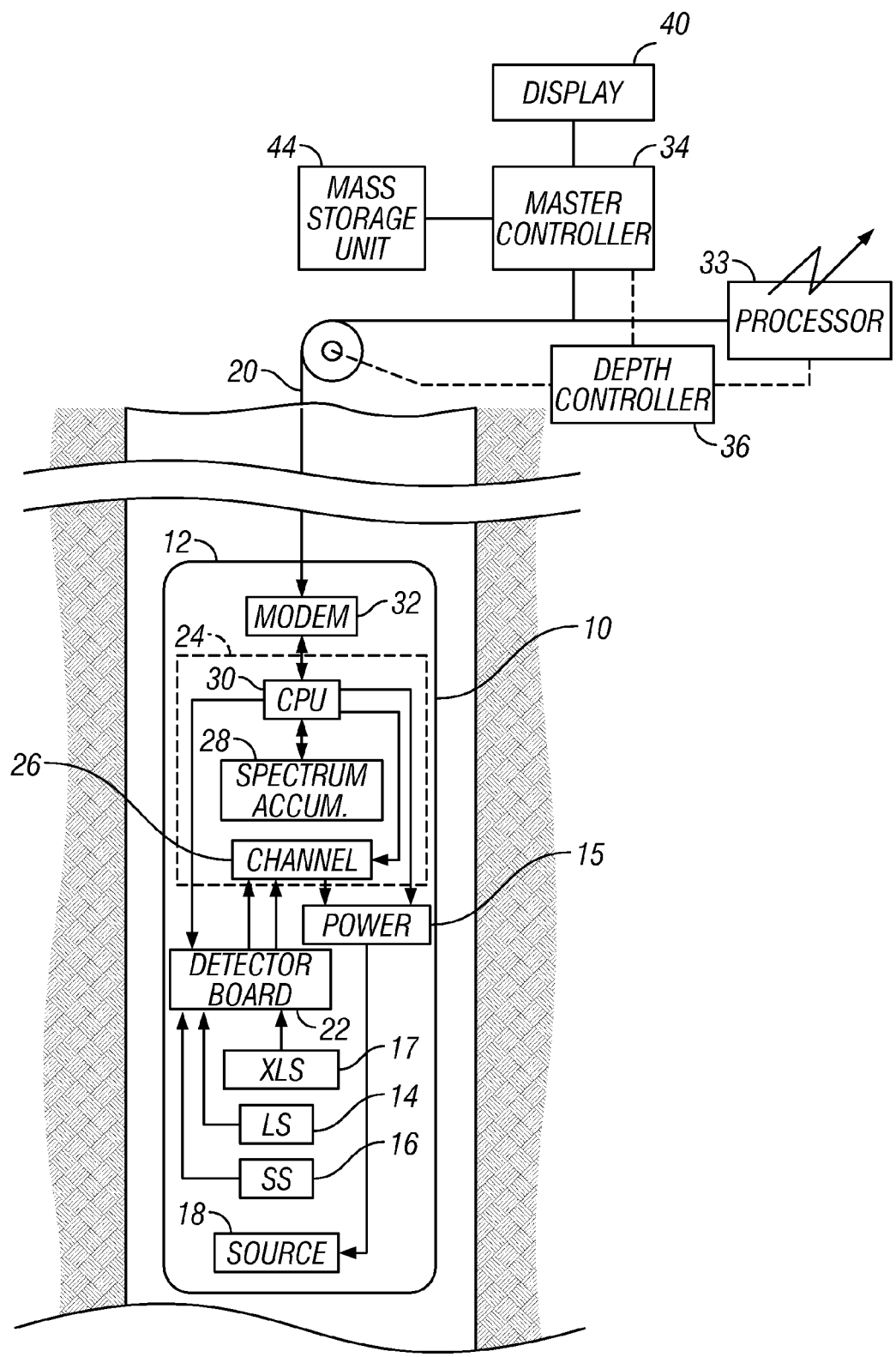
FIG. 1 is an overall schematic diagram of the nuclear well logging system of the present invention.

The system shown in FIG. 1 is a system for density logging. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes an extra-long spaced (XLS) detector 17, a long-spaced (LS) detector 14, a short-spaced (SS) detector 16 and pulsed neutron source 18. In one embodiment of the invention, XLS, LS and SS detectors 17, 14 and 16 are comprised of suitable material such as bismuth-germanate (BGO) crystals or sodium iodide (NaI) coupled to photomultiplier tubes. To protect the detector systems from the high temperatures encountered in boreholes, the detector system may be mounted in a Dewar-type flask. This particular source and flask arrangement is an example only, and should not be considered a limitation. Also, in one embodiment of the invention, source 18 comprises a pulsed neutron source using a D-T reaction wherein deuterium ions are accelerated into a tritium target, thereby generating neutrons having energy of approximately 14 MeV. This particular type of source is for exemplary purposes only and not to be construed as a limitation. The filament current and accelerator voltage are supplied to source 18 through power supply 15. Cable 20 suspends instrument 12 in well 10 and contains the required conductors for electrically connecting instrument 12 with the surface apparatus.

The outputs from XLX, LS and SS detectors 17, 144 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. As discussed below with reference to FIG. 2, this population of high energy neutrons introduced into the formation will cause the generation of gamma rays within the formation which at various times will impinge on XLS, LS and SS detectors 17, 14 and 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If such pulse has an amplitude corresponding to an energy of at least approximately 100 KeV, the voltage pulse is transformed into a digital signal and passed to channel generator 26 of MCS section 24.

In addition, as would be known to those versed in the art, many of the functions of the components described with reference to FIG. 1 may be carried out by a processor. It should also be noted that the system described in FIG. 1 involves conveyance of the logging device into the well by a wireline. However, it is envisaged that the logging device could be part of a measurement while drilling (MWD) bottom hole assembly conveyed into the borehole by a drilling tubular such as a drillstring or coiled tubing. In addition, it should be noted that FIG. 1 illustrates a tool in an open hole. The method and apparatus are equally well suited for use in cased holes.

Figure 2:
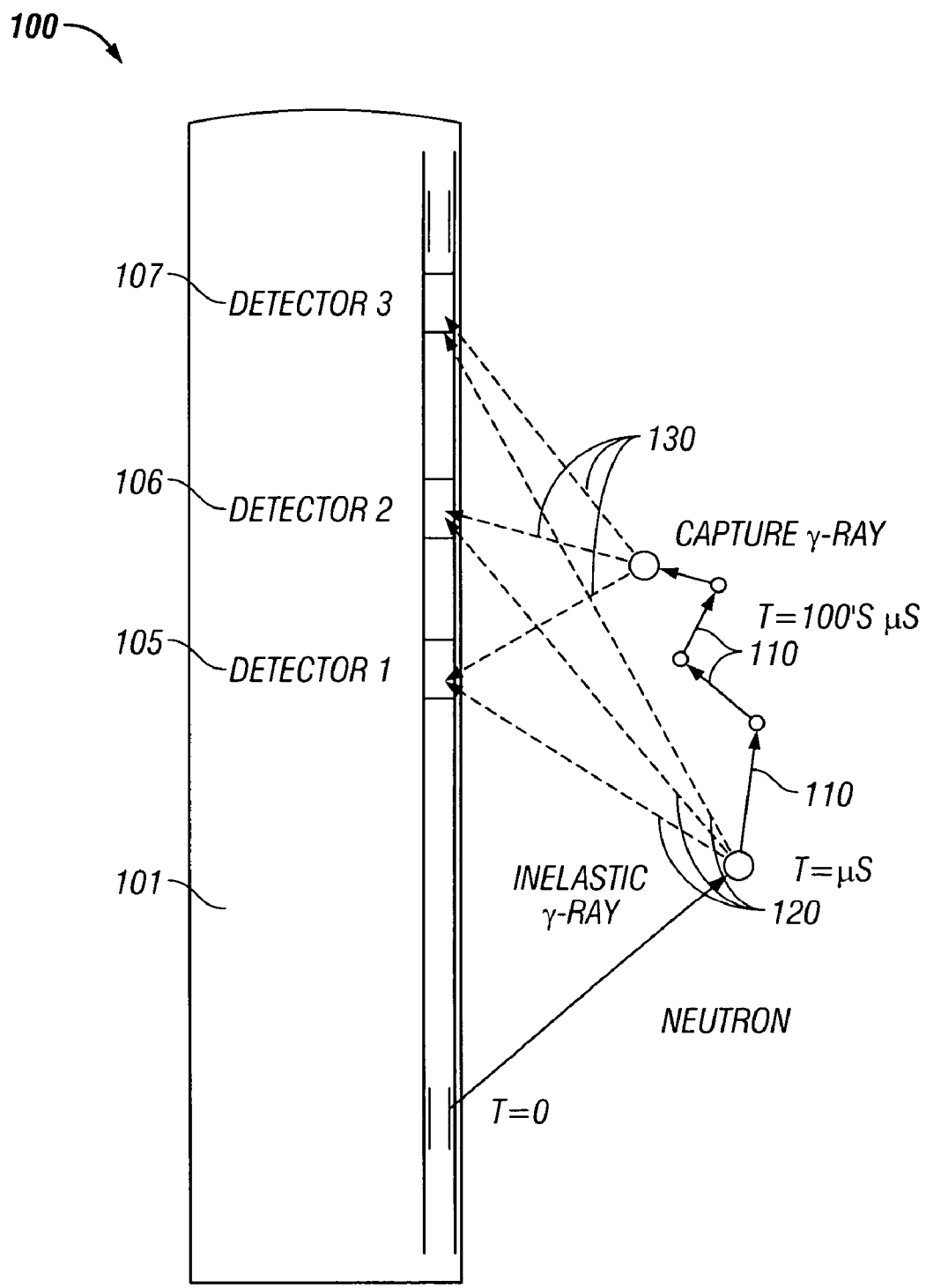
FIG. 2 (prior art) illustrates the generation of gamma rays by inelastic scattering and capture of thermal and epithermal neutrons.

FIG. 2 shows an illustration of the logging tool suitable for use with the present invention. The apparatus illustrated is that of the Reservoir Performance Monitor (RPM) of Baker Atlas Incorporated. A measurement device 100 comprises a neutron source 101 and three axially spaced apart detectors described below. The number of detectors shown in the embodiment of FIG. 2 is only an example of the number of detectors employed in an embodiment of the present invention. It is not a limitation on the scope of the present invention. The measurement device of the present invention may comprise two or more detectors. The neutron source 101 may be pulsed at different frequencies and modes for different types of measurements. The short-spaced (SS) detector 105 is closest to the source 101 The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds ($\mu$s), before they lose much energy, some neutrons are involved in inelastic scattering with nuclei in the borehole and formation and produce gamma rays. These inelastic gamma rays 120, have energies that are characteristic of the atomic nuclei that produced them. The atomic nuclei found in this environment include, for example, carbon, oxygen, silicon, calcium, and some others.

Two or more gamma-ray detectors are employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

In a pulsed neutron spectrometry mode, the instrument pulses at 10 kHz, for example, and records full inelastic and capture gamma ray energy spectra from each detector. These data are processed to determine elemental ratios including carbon/oxygen and calcium/silicon from the inelastic spectra and silicon/calcium from the capture spectra.

With the neutron generator turned off, the measurement apparatus can also be used to detect the distribution of materials, tagged with radioactive tracers, that are injected into the well during well treatments. In this manner, the effectiveness of operations such as hydraulic fracturing or gravel pack placement can be evaluated.

In an embodiment of the present invention, a pulsed neutron generator with improved reliability and higher output is coupled with high-speed downhole microprocessor-controlled drivers and detector electronics. The system supports multiple frequency operation and different detection gate timings to make the different measurements. The modes of operation can be selected from the surface with no need to pull the tool out of the well.

After just a few µs, most of the neutrons are slowed by either inelastic or elastic scattering until they reach thermal energies, about 0.025 eV. This process is illustrated schematically in FIG. 2 as the sequence of solid arrows 110. At thermal energies, neutrons continue to undergo elastic collisions, but they no longer lose energy on average. A few µs after the neutron generator shuts off, the process of thermalization is complete. Over the next several hundred µs, thermal neutrons are captured by nuclei of various elements—again producing gamma rays, known as capture gamma rays 130. A capture gamma ray energy spectrum yields information about the relative abundances of these elements. The inelastic gamma rays are depicted by 120.

We next give a broad overview of a method of the present invention. As noted above, the objective is to determine gas saturation and/or gas pressure in a reservoir. We discuss first the situation in which the gas pressure is known and the objective is to determine the gas saturation. We next discuss the situation in which the gas saturation is known and the objective is to determine the gas pressure. We finally discuss a method of determining simultaneously the gas saturation and the gas pressure.

Figure 3:
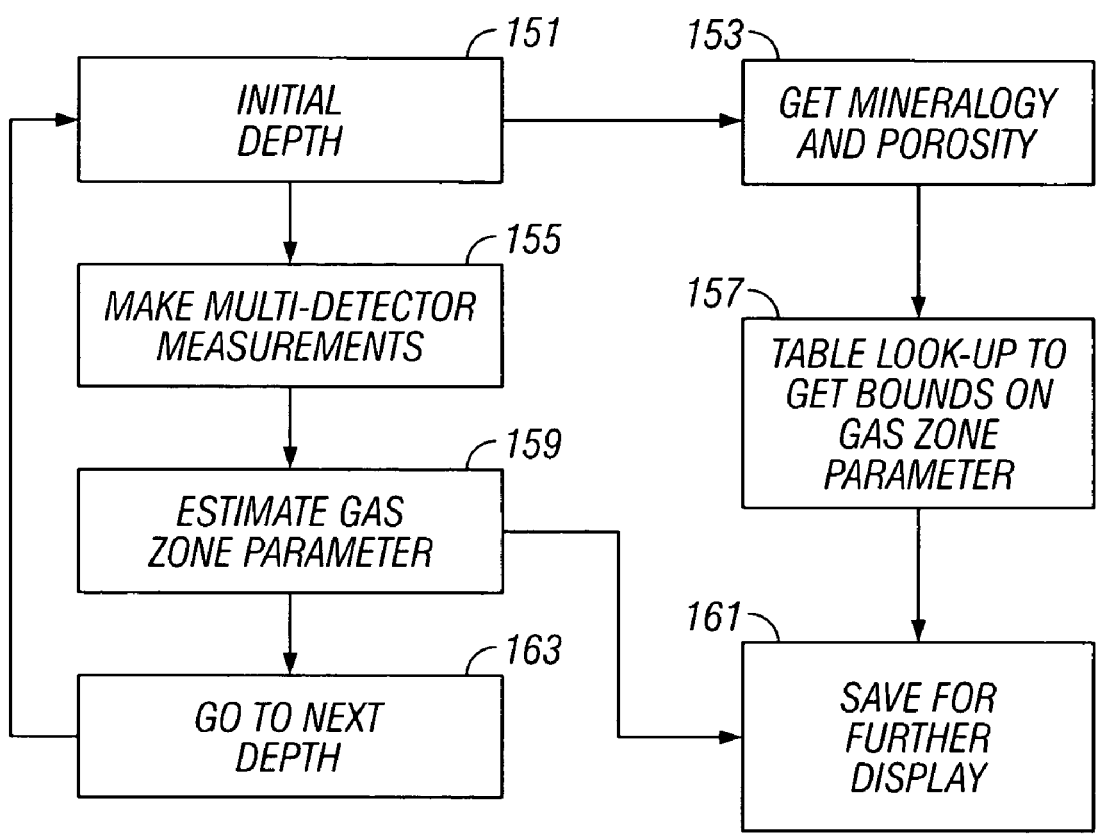
FIG. 3 is a flow chart illustrating one part of the invention relating to determination of gas saturation and gas pressure.

Turning now to FIG. 3, the methodology for determining gas saturation is discussed. The method is discussed in the context of processing of the data subsequent to measurement and recording, but it is to be understood that some or all parts of the method can be implemented substantially in real time. An initial depth is selected 151. Corresponding to the initial depth, inelastic gamma ray measurements are made by the three or more detectors 155. The depth information is used to identify 153 parameters such as the mineralogy and effective porosity of the earth formation at the depth 151. The mineralogy and effective porosity may be obtained from prior measurements made under open-hole conditions, from rock cuttings, from core samples etc. The effective porosity $\phi_e$ is generally less than the total porosity $\phi$ that is determined by porosity logging tools. Effective porosity is the proportion of void space that excludes sealed-off pores. It thus measures the pore volume that is effectively interconnected. It may be determined, for example, by NMR measurements.

From the measurements made by the detectors 155, the ratio $R_{IN13}$ (the ratio of the count rates measured at the near detector 16 and the extra-long spacing detector 17 for inelastic collisions) is determined. This ratio has been found to be the most sensitive to the effects of gas. It should be noted that the ratio $R_{IN23}$ (the ratio of the count rates measured at the long detector 14 and the extra-long spacing detector 17 for inelastic collisions) is also sensitive to the formation gas, but the statistical variability of this ratio is generally greater than that of $R_{IN12}$ (the ratio of the count rates measured at the near detector 16 and the long spacing detector 14 for inelastic collisions) and $R_{IN13}$. In one embodiment of the present invention, a weighted combination of the measurements may be used 159. This weighted combination is discussed in U.S. patent application Ser. No. 10/955,867 of Gilchrist et al., having the same assignee as the present invention and the contents of which are incorporated herein by reference. We define any of these quantities as a Fluid Zone parameter (FZP). It should also be noted that the ratio $R_{ATO13}$ of the capture gamma ray counts measured at the near detector 16 and the extra-long spacing detector 17 is even more sensitive to the presence of gas and may be used in one embodiment of the invention. However, capture gamma ray counts are also sensitive to factors such as formation salinity and shale minerals and proper correction is needed for these other factors. It should be noted that during the time interval in which inelastic gamma rays are measured, there is also a contribution from capture gamma rays. Typically, both the inelastic and the capture gamma rays are measured over the same energy band of approximately 0.1 MeV to 8 MeV. In one embodiment of the invention, improved counts of inelastic gamma rays are obtained by correcting for the contribution from the capture gamma rays. A method of making this correction is disclosed, for example, in U.S. Pat. No. 5,374,823 to Odom. Other methods would be known to those skilled in the art.

A table look-up is performed 157 for bounds on the FZP. The table is generated using a Monte Carlo simulation. It should be noted that the term "table look-up" as used herein is intended to include equations derived from Monte Carlo simulation relating the various factors considered in the simulation. The Monte Carlo simulation may include such factors as the formation mineralogy and effective porosity, the known tool response characteristics, the formation fluid density, the borehole fluid density, the borehole diameter and the casing diameter. In one embodiment of the invention, four broad minerals are considered: sandstones, shales, limestone and dolomite. In one embodiment of the invention, the gas pressure is taken as a known quantity and the table look-up is for a fixed gas pressure. The gas pressure may be determined using flow tests. The density of the formation fluid may be determined using devices such as that disclosed in U.S. Pat. No. 5,473,939 to Michaels et al., having the same assignee as the present invention and the contents of which are incorporated herein by reference. Density measurements may also be made at the surface. The borehole fluid properties may be measured at the surface and appropriate temperature and pressure corrections applied for downhole conditions.

Based on the table look-up, a value is generated for 0% gas saturation and 100% gas saturation. These are the bounds (referred to as the envelope) for the FZP. Values for the bounds and the FZP are stored for display 161 and the next depth is processed 163. This process continues until all the depths have been processed. It should be noted that curves may also be generated for additional values of $S_g$. The relationship between FZP and $S_g$ at constant gas pressure is not linear, so that for quantitative analysis, nonlinear or linear interpolation or extrapolation may be done.

Figure 4:
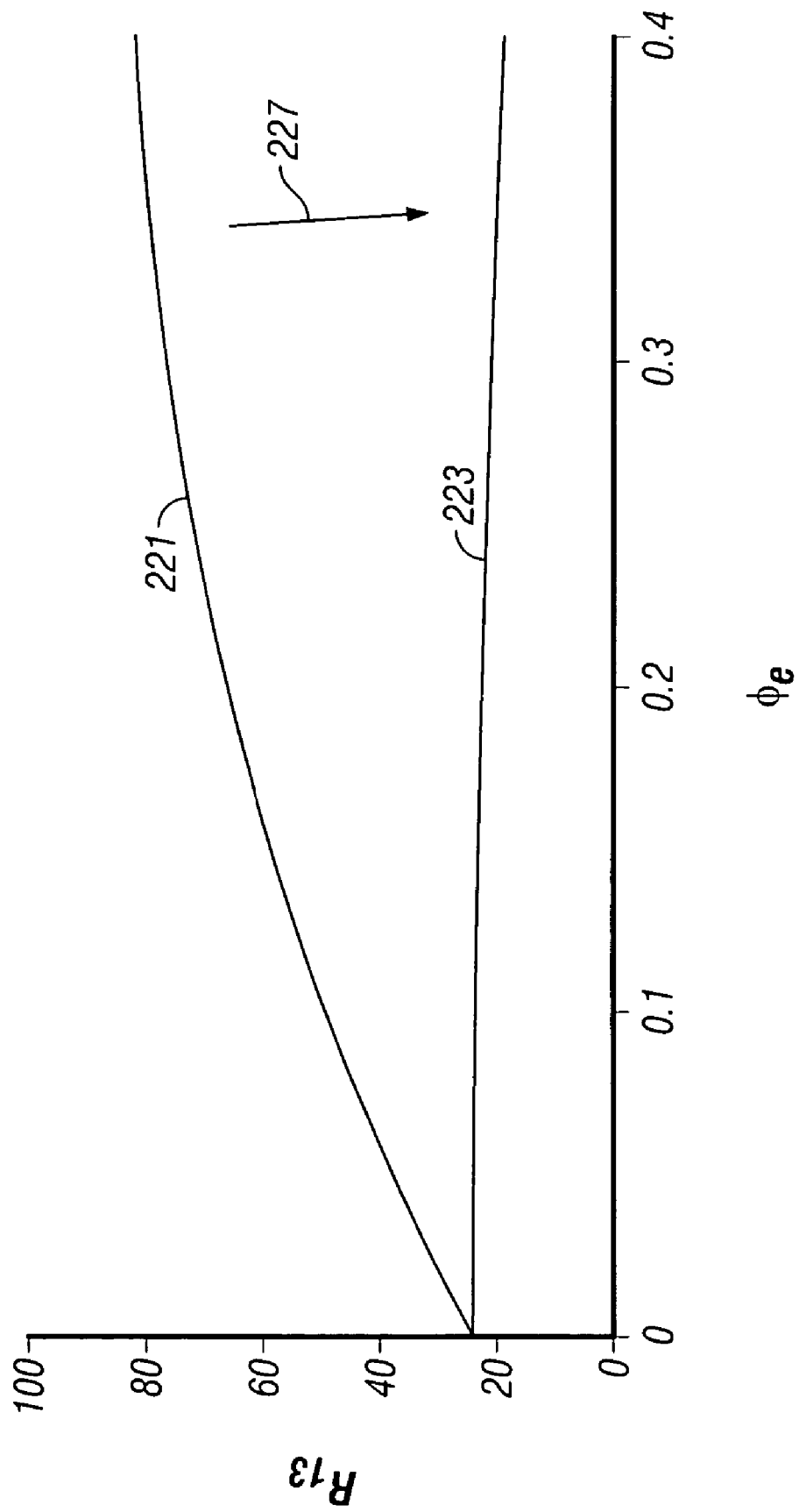
FIG. 4 shows an exemplary variation of the Fluid Zone Parameter (FZP) as a function of porosity for a water-saturated and a gas-saturated reservoir.

FIG. 4 illustrates the qualitative foundation for the gas envelope. The abscissa represents the effective porosity of a gas sand within the reservoir while the ordinate is the FZP. The curve 221 is the FZP for $S_g=0$ while the curve 223 is the FZP for $S_g=1$ for a given gas density (which corresponds to a fixed gas pressure). As the gas sweep of the reservoir progresses, the gas saturation progressively increases, denoted by the arrow 227, and can be readily seen in a display such as that in FIG. 5 during the course of EOR operations.

Figure 5:
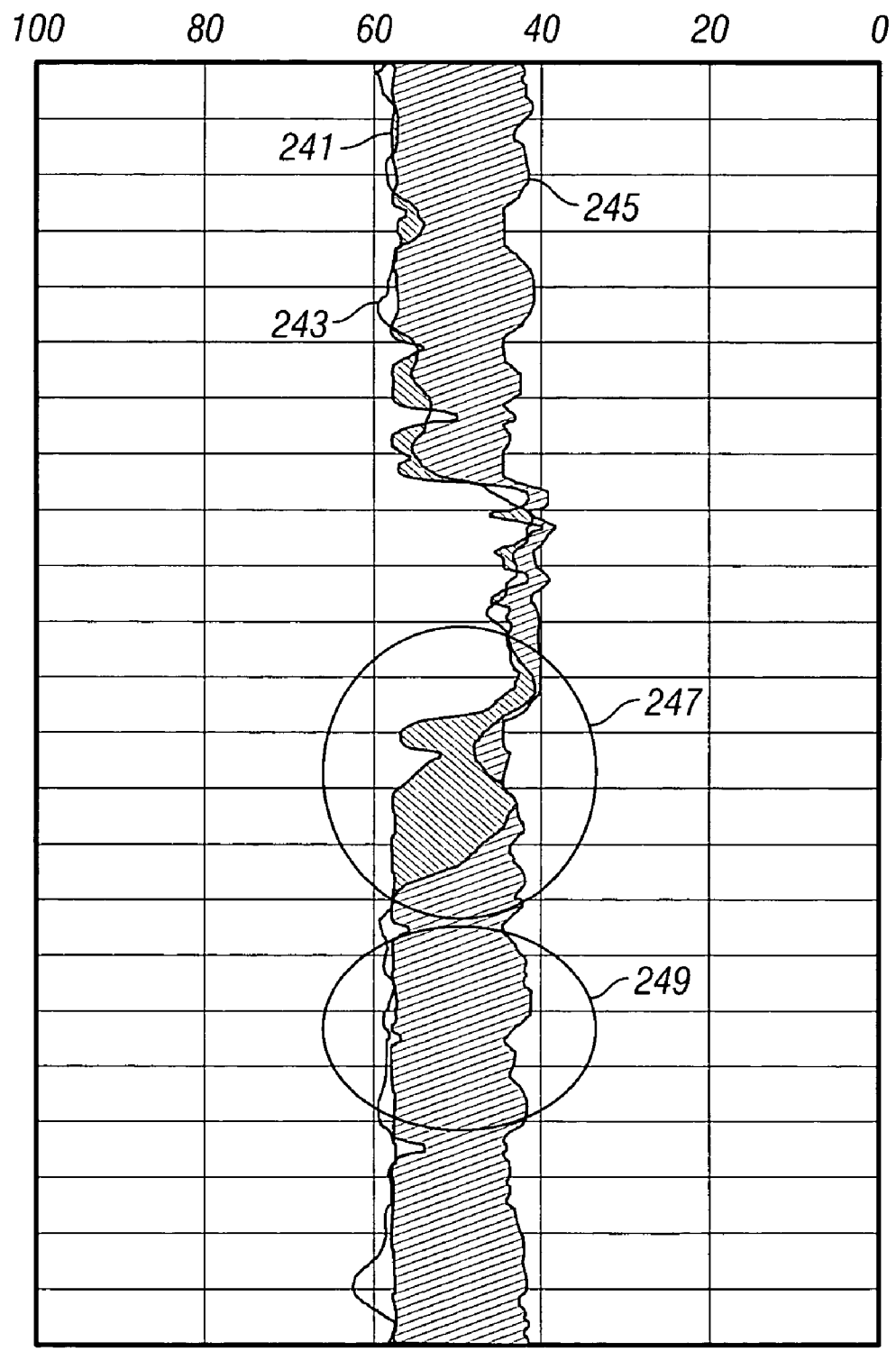
FIG. 5 is an exemplary display of the FZP in a well used in enhanced oil recovery.

FIG. 5 shows an exemplary display generated by the present invention. The data are from a well in a limestone reservoir that is part of an enhanced oil recovery program The curve 241 corresponds to the "wet" side, i.e., 0% gas saturation. The curve 245 corresponds to 100% gas saturation and represents the "gas" side. The curve 243 is the measured value of the FZP. It can be seen that in the zone identified as 247, the curve 243 departs from the wet side curve 241: this is an indication of the presence of gas, the degree of separation being indicative of the gas saturation. It should be noted that the relationship is not necessarily linear, so that linear or nonlinear interpolation or extrapolation may be used to quantify the gas saturation. In the zone identified as 249, the curve 243 basically overlies the wet curve 241 and is an indication of a wet zone with an absence of gas.

While the example given above is for an EOR operation, similar results may be obtained in gas wells: the separation of the FZP from the "wet" value may be used for identifying gas sands within the reservoir. Subsequent development of the reservoir would then be based on perforating the casing at the identified gas intervals and producing the gas.

The embodiment of the invention described above used the ratio $R_{IN13}$ of the counts of inelastic gamma rays for the near and extra long-spaced detector. The invention may also be practiced using the inverse of the inelastic gamma ray counts for the extra long-spaced detector R'=N/IXS, where N is a constant.

Figure 6:
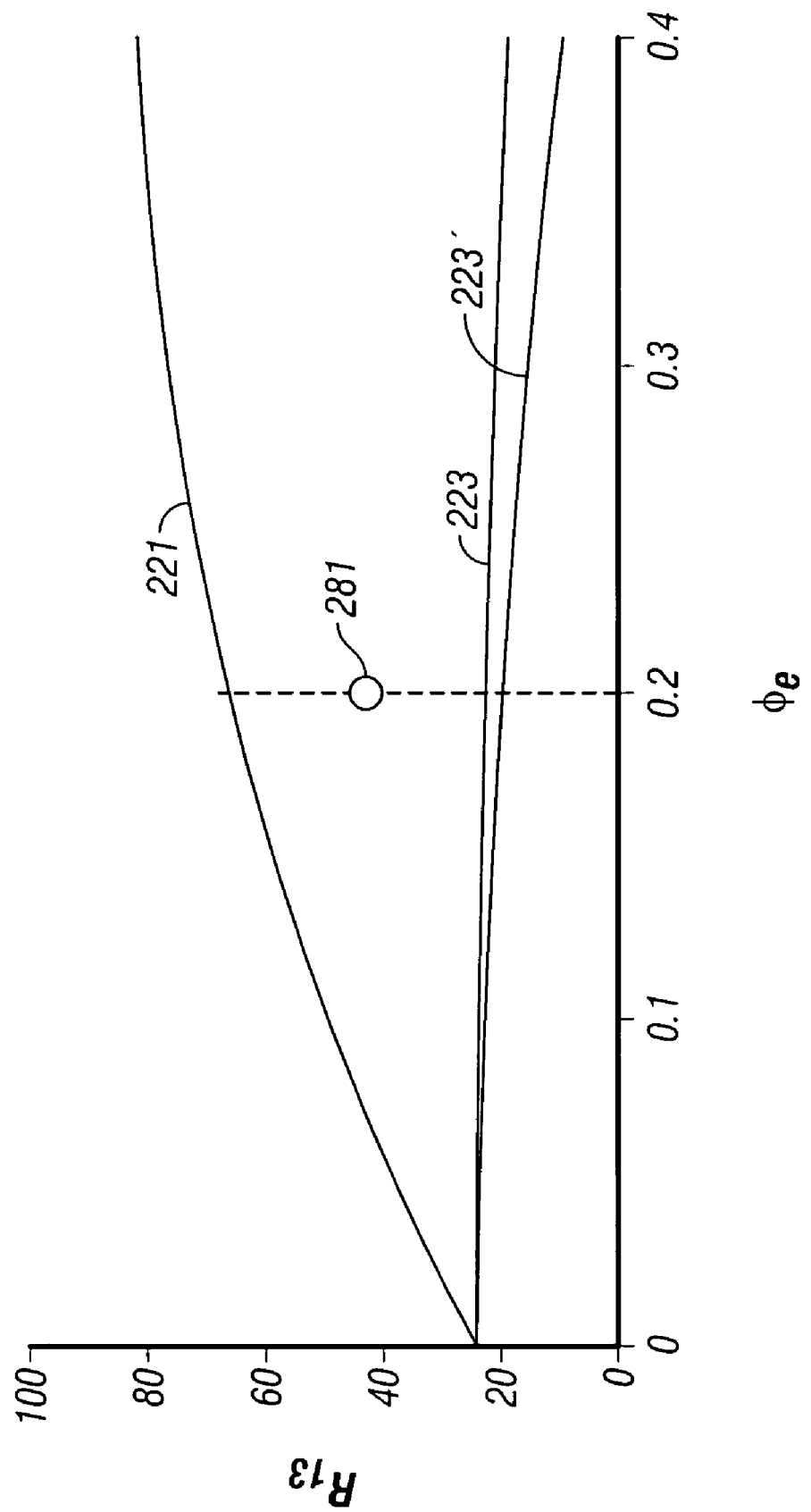
FIG. 6 shows an example of the effect of gas pressure on the variation of the Fluid Zone parameter (FZP) as a function of effective porosity for a water-saturated and a gas saturated reservoir.

In another embodiment of the invention, the gas pressure may be determined. The basis for this is illustrated in FIG. 6. This is similar in appearance to FIG. 4. Here, the curve 223 represents the FZP as a function of effective porosity and may correspond to the initial gas pressure of a gas reservoir. As production continues, and assuming that there is no influx of water in the reservoir (constant $S_g$), the gas pressure drops, the gas density decreases and the FZP decreases. This results in the curve 223' where the FZP is lower than in 223. This means that at a fixed gas saturation, a lower gas pressure results in a bigger envelope. Note that the wet limit 221 for the envelope is independent of the gas pressure. As with the effect of $S_g$ on FZP, the effect of $P_g$ on FZP may also be nonlinear. More than two curves may be generated and linear or nonlinear interpolation or extrapolation may be used for quantitative estimation of gas pressure.

Figure 7:
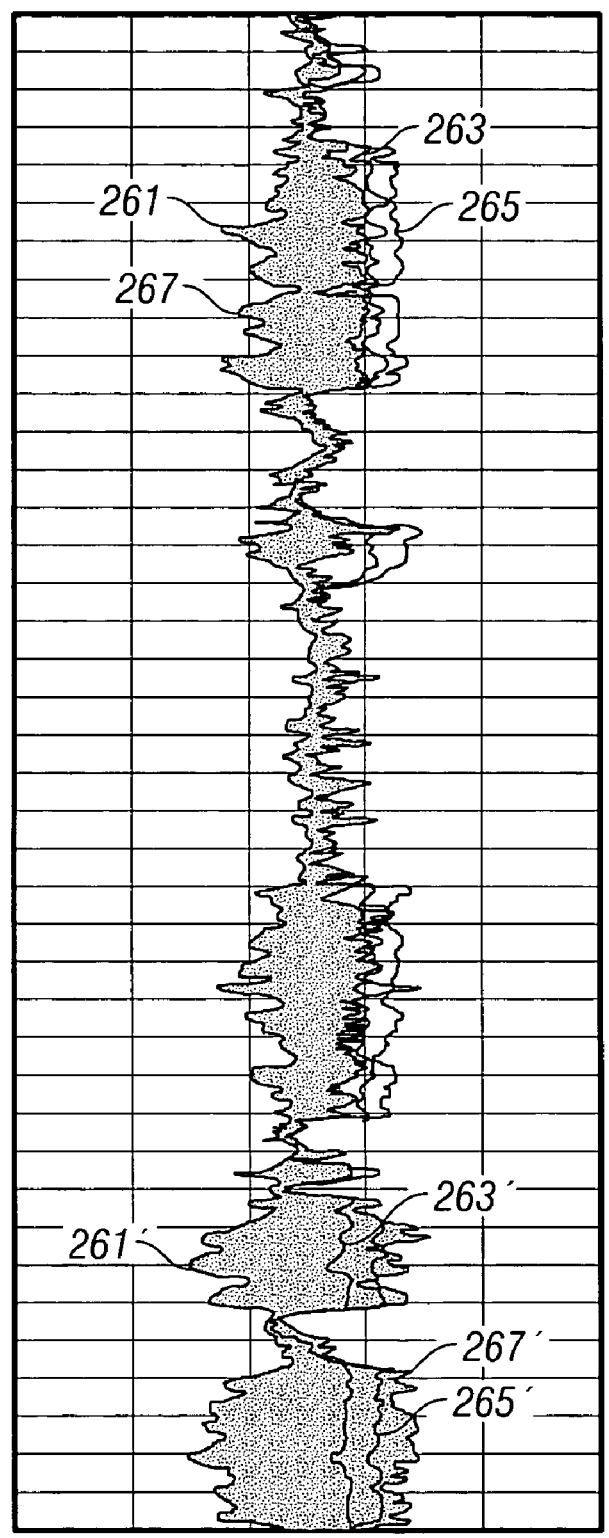
FIG. 7 shows an example of a gas reservoir having a depleted zone.

An example from a natural gas reservoir is shown in FIG. 7. Near the top of the section, the curve 261 is the wet bound, the curve 263 is the curve at the initial gas pressure for $S_g=1$. The curve 265 is the $S_g=1$ curve for a depleted reservoir gas pressure that corresponds to a pressure at which the reservoir would be abandoned. The actual measurements 267 lie close to the curve 263, indicating that at least in the top of the section, the reservoir has not been pressure depleted.

The same is not true towards the bottom of the section. The curve 261' is the wet bound, the curve 263' is the curve at the initial reservoir gas pressure for $S_g=1$. The curve 265' is the $S_g=1$ curve for a depleted reservoir gas pressure. The actual measurements 267' lie close to the curve 265', indicating that the deeper gas reservoirs have been pressure depleted and the gas pressure reduced. This has an important bearing on the reservoir development.

The present invention recognizes the fact that the assumptions of constant gas pressure or the assumption of constant gas saturation may not be satisfied. Accordingly, in one embodiment of the invention, the Carbon/Oxygen (C/O) ratio is also determined. As would be known to those versed in the art, the inelastic gamma rays scattered at an energy of about 4.4 MeV are primarily due to carbon nuclei in the formation. The inelastic gamma rays scattered at an energy of about 6.13 MeV are indicative of oxygen nuclei in the formation. The C/O ratio is an independent measurement that is affected by both the gas saturation and the gas pressure.

In order to see how this may be used, we first examine FIG. 6 in more detail and draw some inferences from it. We note that a point such as 281 in FIG. 6 (which has a given value of FZP and effective porosity) can be the result of different combinations of gas pressure and gas saturation, or, equivalently, gas density and gas saturation. Using a plurality of values of $\rho_g$, this relation may be qualitatively represented by the curve 283.

Figure 9:
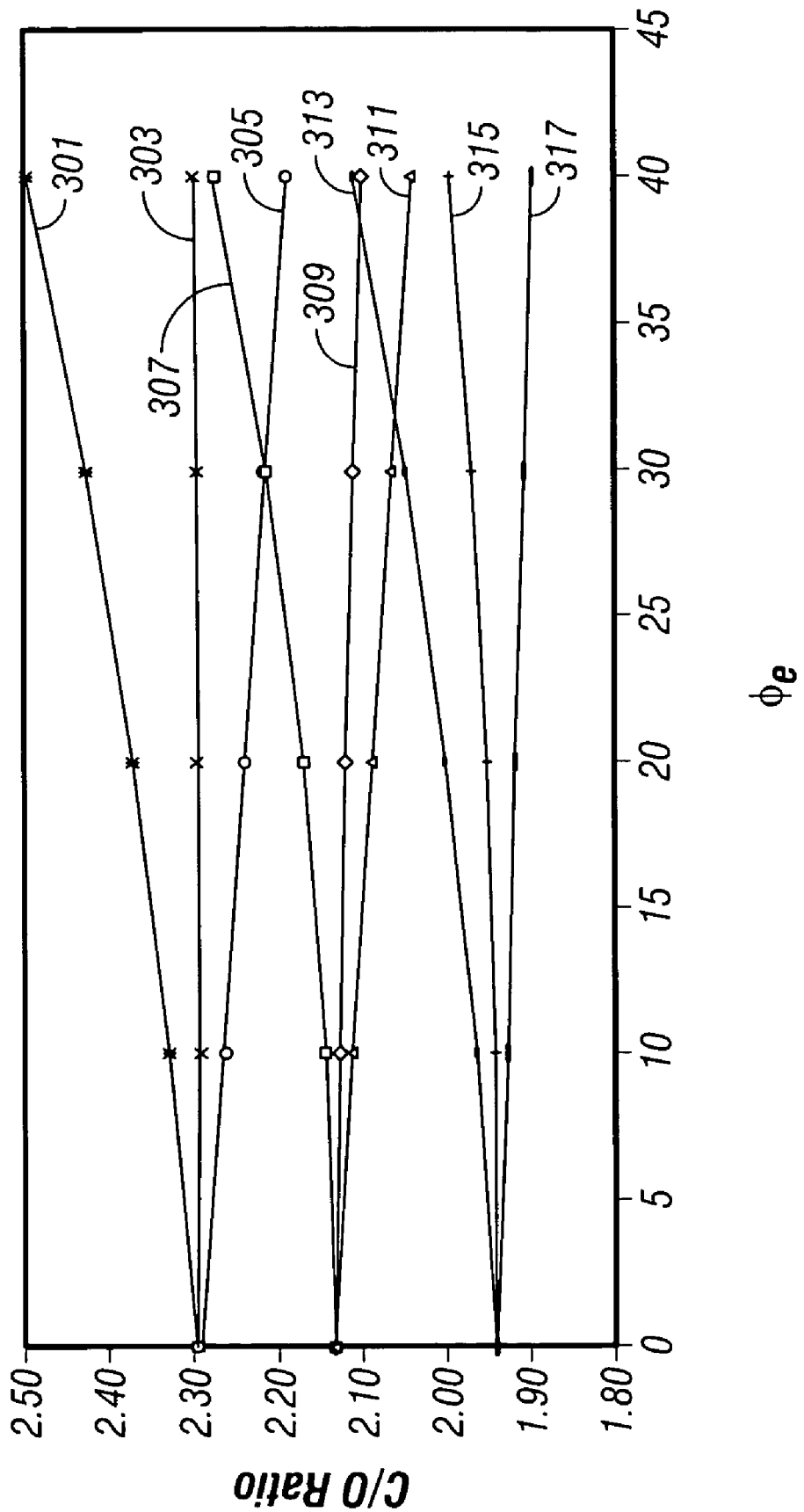
FIG. 9 is an exemplary plot showing variation of the C/O ratio as a function of effective porosity for different formation fluids.

We next see what information about gas saturation may be obtained from the C/O ratio. The C/O ratio for a given borehole diameter and casing diameter depends upon effective porosity, the fluid in the rock and the fluid in the borehole. An example is given in FIG. 9. The abscissa is the effective porosity and the ordinate is the C/O ratio. The curves 301, 303 and 305 for an oil saturated rock, a gas saturated rock and a water saturated rock, all for a borehole full of oil. The curves 307, 309, 311 are corresponding curves for a borehole full of gas, while the curves 313, 315, 317 are for a water filled borehole. The curves in FIG. 9 are for the LS detector in a borehole of diameter 8.5 inches (21.59 cm) and a casing diameter of 5 inches (12.7 cm). Similar curves exist for the SS detector.

Figure 8:
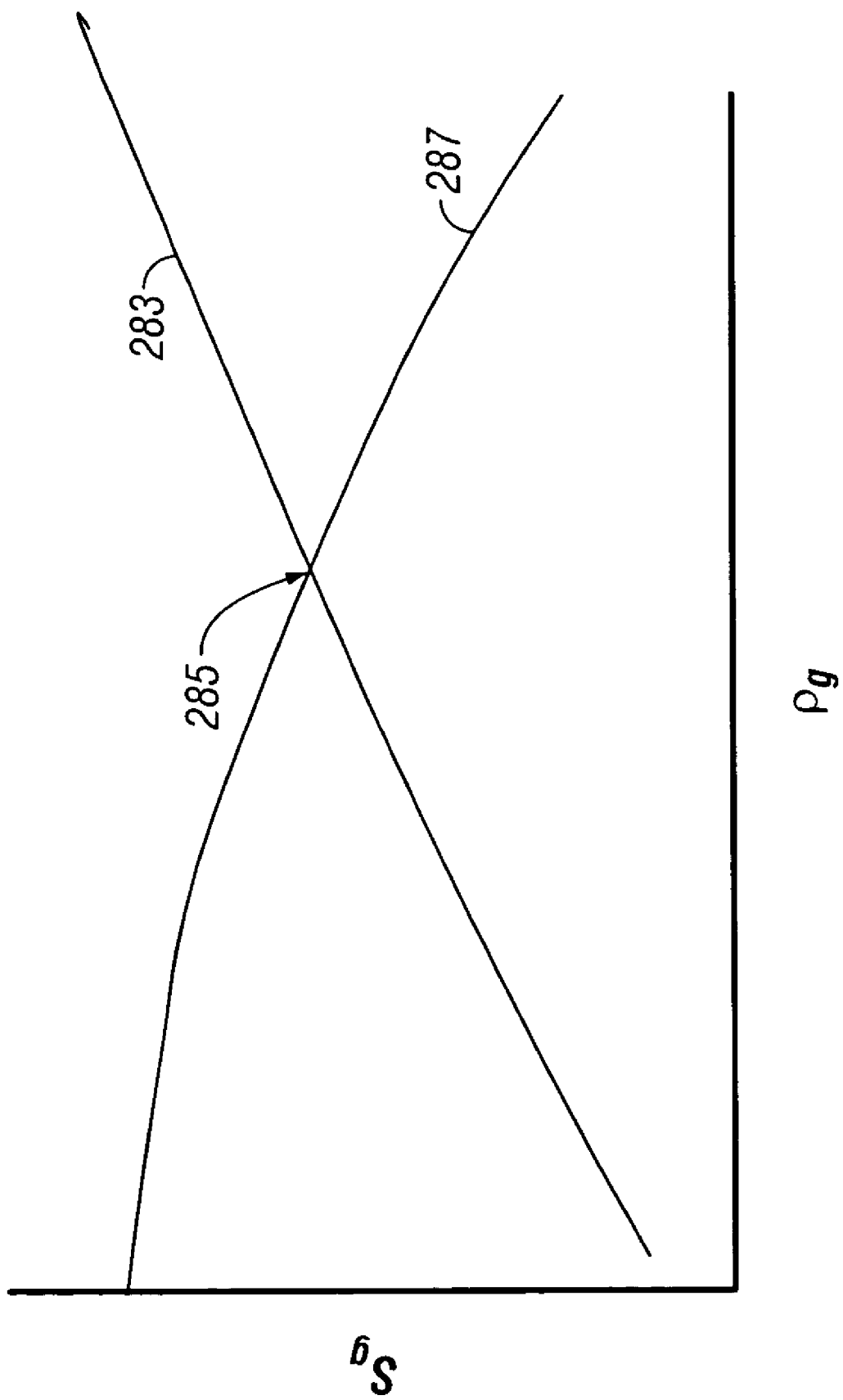
FIG. 8 illustrates the principle of using FZP and C/O measurements to determine saturation and pressure.

Again, for a given effective porosity, a measured value of the C/O ratio can be obtained from various combinations of $S_g$ and $\rho_g$ for a plurality of values of the effective porosity. This is represented in FIG. 8 by the curve 287. The intersection of curves 287 and 283 at the point 285 gives the unique solution for $S_g$ and $\rho_g$ corresponding to the observed values of the FZP and the C/O ratio. The gas pressure is then determinable from the gas density and the equation of state of the gas. The simplest known example of an equation of state is the one relating the pressure P, the volume V, and the absolute temperature T of one mole of a perfect gas; that is, PV=RT, in which R is the universal gas constant. Dense real gases have more complicated equations of state but these are determinable for natural gas.

Figure 10:
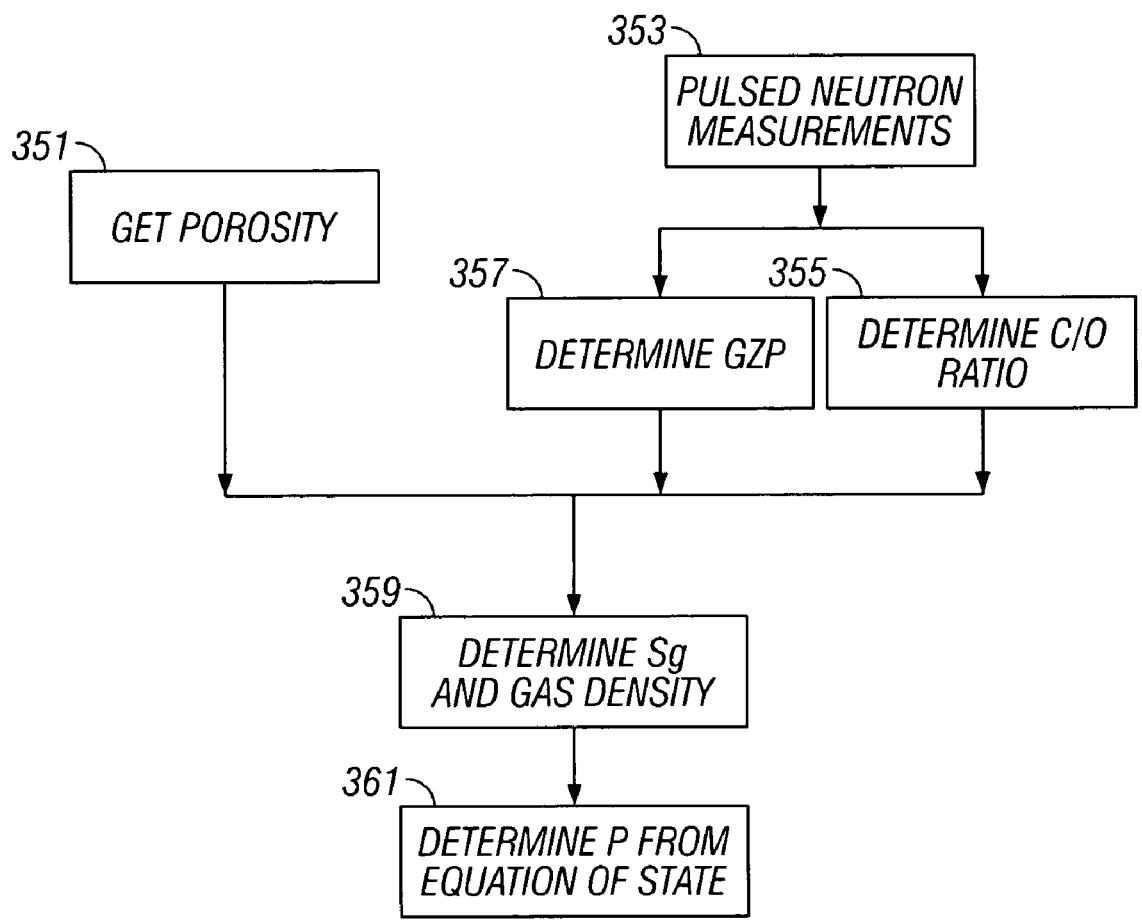
FIG. 10 is a flow chart illustrating the methodology for simultaneous determination of formation pressure and gas saturation from FZP and C/O ratios.

This embodiment of the invention is illustrated by the flow chart of FIG. 10. Pulsed neutron measurements are made 353 at a particular depth. The FZP and the C/O ratio are determined 355, 357 from the pulsed neutron measurements. From known values of effective porosity 351, the $S_g$ and $\rho_g$ are determined 359 as discussed above. Using the equation of state, the gas pressure may be determined 361. This is repeated for additional depths. As noted above, the FZP determination is lithology specific and may further consider the effects of casing. In view of the differences in the C/O ratio estimated by the SS and the XLS detector, either one or a weighted combination of the estimates may be used.

Figure 11:
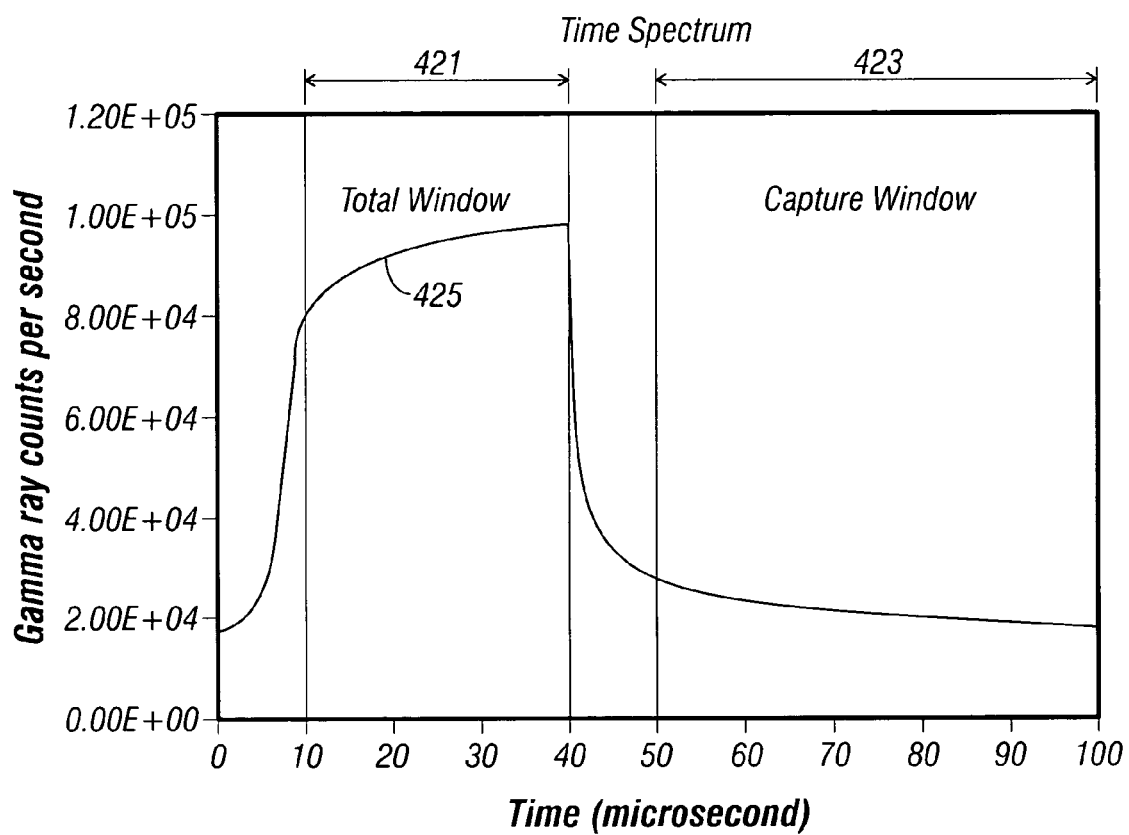
FIG. 11 shows an example of the inelastic scattering window and the capture window with pulsed neutron measurements.

Another embodiment of the invention makes use of measurements of capture gamma rays. FIG. 11 illustrates the basic timing of the pulsed neutron source and the produced gamma rays. Time is displayed along the x-axis in microseconds. The gamma ray counts per second (cps) is displayed along the y-axis. The neutron burst is over a time interval 421 and defines a first-detector-gate interval, referred to as the "burst gate" or inelastic gate. A total spectrum 425 of gamma rays resulting from both inelastic neutron scattering and capture gamma ray scattering is produced during the active duration of the neutron source, and the timing of the inelastic gate enables obtaining the total spectrum. The measurements in this gate are dominated by the inelastic gamma rays. In one embodiment of the invention, suitable correction is made for the capture gamma rays in this gate using known methods. In the example of FIG. 11, the number of counts rises significantly (typically to $10^5$) during the inelastic gate, which extends approximately from 10 µs to 40 µs. The deactivation of the neutron source causes the inelastic gamma rays to disappear from the count almost immediately. A "dead-zone" is shown at a point substantially coincident with deactivation of the neutron source. This dead-zone extends approximately from 40 µs to 50 µs. The counts obtained during this interval are not recorded. The dead-zone is followed by a "capture gate" 423. The capture gate contains gamma rays substantially due to captured neutrons from the surrounding formation. We next discuss the use of measurements made within the "capture" gate 423 of capture gamma rays for determination of oil-water saturation. It should be noted that the timings referred to above are for exemplary purposes only and not to be construed as a limitation.

Figure 12:
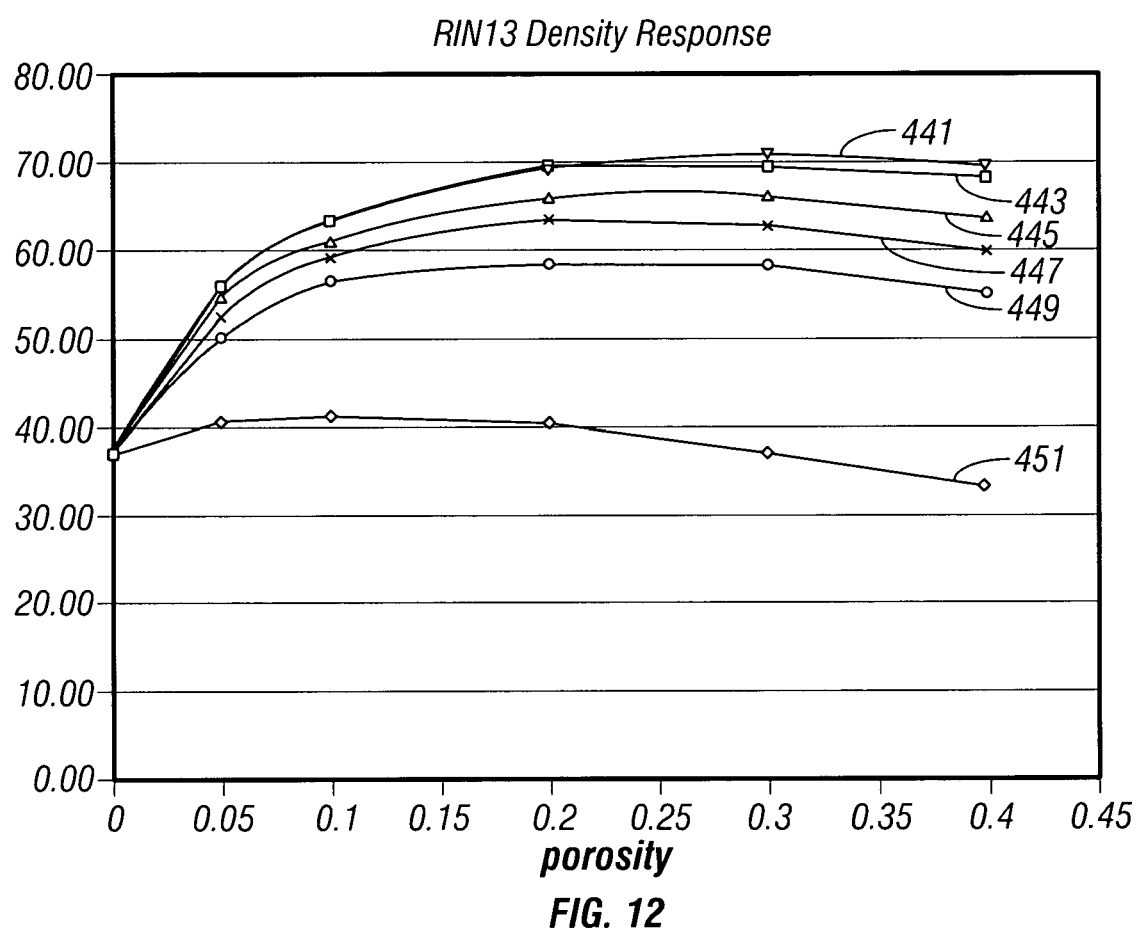
FIG. 12 shows the effect of oil density on the ratio of inelastic gamma ray counts for the near and extra-long spaced detector.

FIG. 12 is a plot similar to FIG. 6, but with some additional data shown. The abscissa is the porosity while the ordinate is the ration $R_{IN13}$ of the inelastic gamma ray counts for the near to extra long detector. The curve 441 corresponds to 100% water saturation while the curve 451 is for 100% gas saturation with a gas density of 0.1 gm/cm$^3$. Also shown in FIG. 12 are curves 443, 445, 447 and 449 for 100% saturation with oil having a density of 0.8, 0.7, 0.6 and 0.5 gm/cm$^3$ respectively. Of particular interest in this response is the fact that there is a clearly defined difference between water and oil, based on a combination of density and Hydrogen Index. Observation of the response charts shows that oil at 0.8 gm/cc and water, whether fresh or not, generate virtually the same response. However any oil which is lower in density generates a different response. The difference is oil density dependant, which provides the fluid saturation measurement.

This means that in the case of heavy crudes with no dissolved gas the measurement will not be of use, conventional C/O logging being the only option for determination of oil saturation. However whenever the in situ density of the oil is less than around 0.75 gm/cc there appears to be sufficient response to make a viable measurement.

The determination of the oil-water saturation using the $R_{ATO13}$ measurements is similar to the method of determining gas saturation using the $R_{IN13}$ measurements discussed above with reference to FIG. 3. This is discussed with reference to FIG. 13. An initial depth is selected 551. Corresponding to the initial depth, capture gamma ray measurements are made by the three or more detectors 555. The depth information is used to identify 553 parameters such as the mineralogy and effective porosity of the earth formation at the depth 551. The mineralogy and effective porosity may be obtained from prior measurements made under open-hole conditions, from rock cuttings, from core samples etc. The effective porosity $\phi_e$ is generally less than the total porosity $\phi$ that is determined by porosity logging tools. Effective porosity is the proportion of void space that excludes sealed-off pores. It thus measures the pore volume that is effectively interconnected. It may be determined, for example, by NMR measurements.

From the measurements made by the detectors 555, the ratio $R_{ATO13}$ of the near to the extra-long spacing detector for capture collisions is determined. A table look-up is performed 555 for bounds on the FZP. The table is generated using a Monte Carlo simulation. It should be noted that the term "table look-up" as used herein is intended to include equations derived from Monte Carlo simulation relating the various factors considered in the simulation. The Monte Carlo simulation may include such factors as the formation mineralogy and effective porosity, the known tool response characteristics, the formation fluid density, the borehole fluid density, the borehole diameter and the casing diameter. In one embodiment of the invention, four broad minerals are considered: sandstones, shales, limestone and dolomite. In one embodiment of the invention, the oil density is taken as a known quantity and the table look-up is for a fixed oil density. The oil density may be determined using flow tests. The density of the formation fluid may be determined using devices such as that disclosed in U.S. Pat. No. 5,473,939 to Michaels et al., having the same assignee as the present invention and the contents of which are incorporated herein by reference. Density measurements may also be made at the surface. The borehole fluid properties may be measured at the surface and appropriate temperature and pressure corrections applied for downhole conditions.

Based on the table look-up, a value is generated for 0% oil saturation and 100% oil saturation. These are the bounds (referred to as the envelope) for the FZP. Values for the bounds and the FZP are stored for display 561 and the next depth is processed 563. This process continues until all the depths have been processed. It should be noted that curves may also be generated for additional values of $S_o$.

Figure 13:
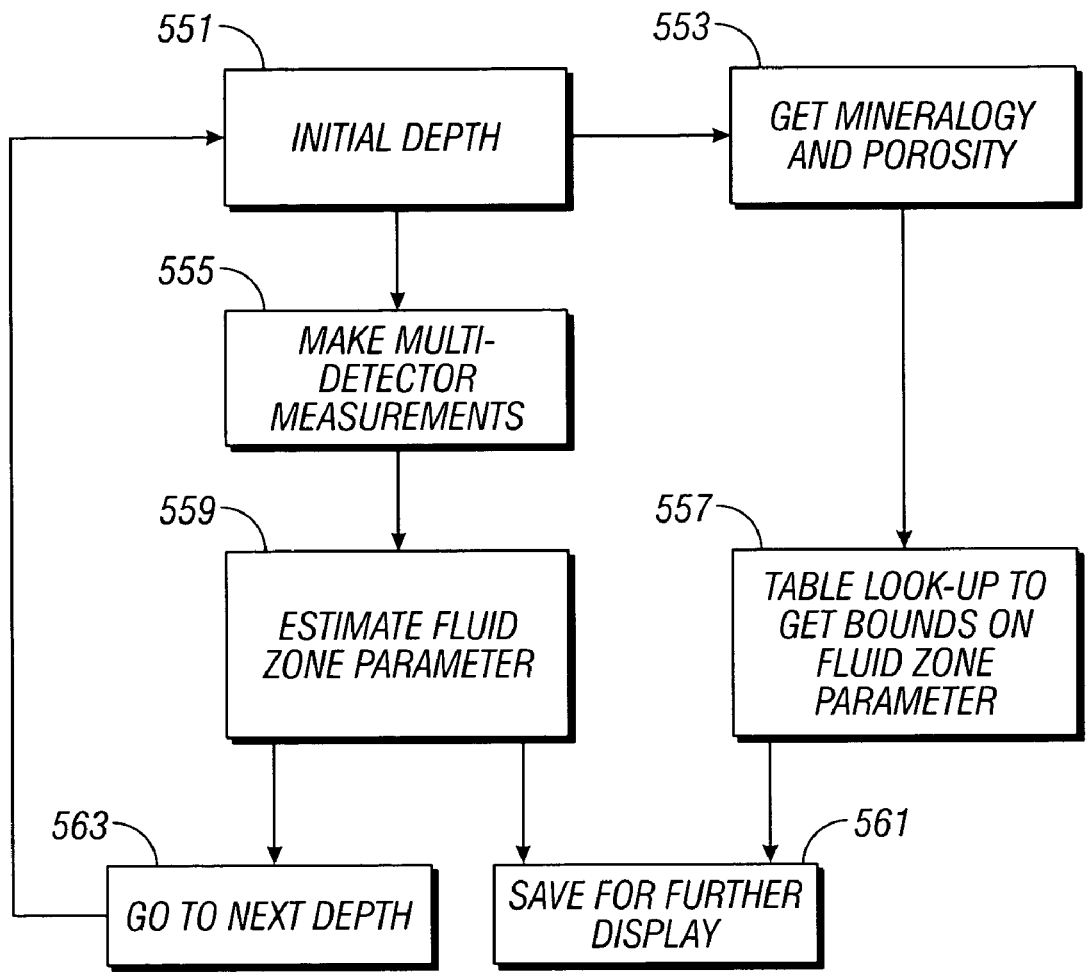
FIG. 13 is a flow chart of the method for determining oil saturation.
Figure 14:
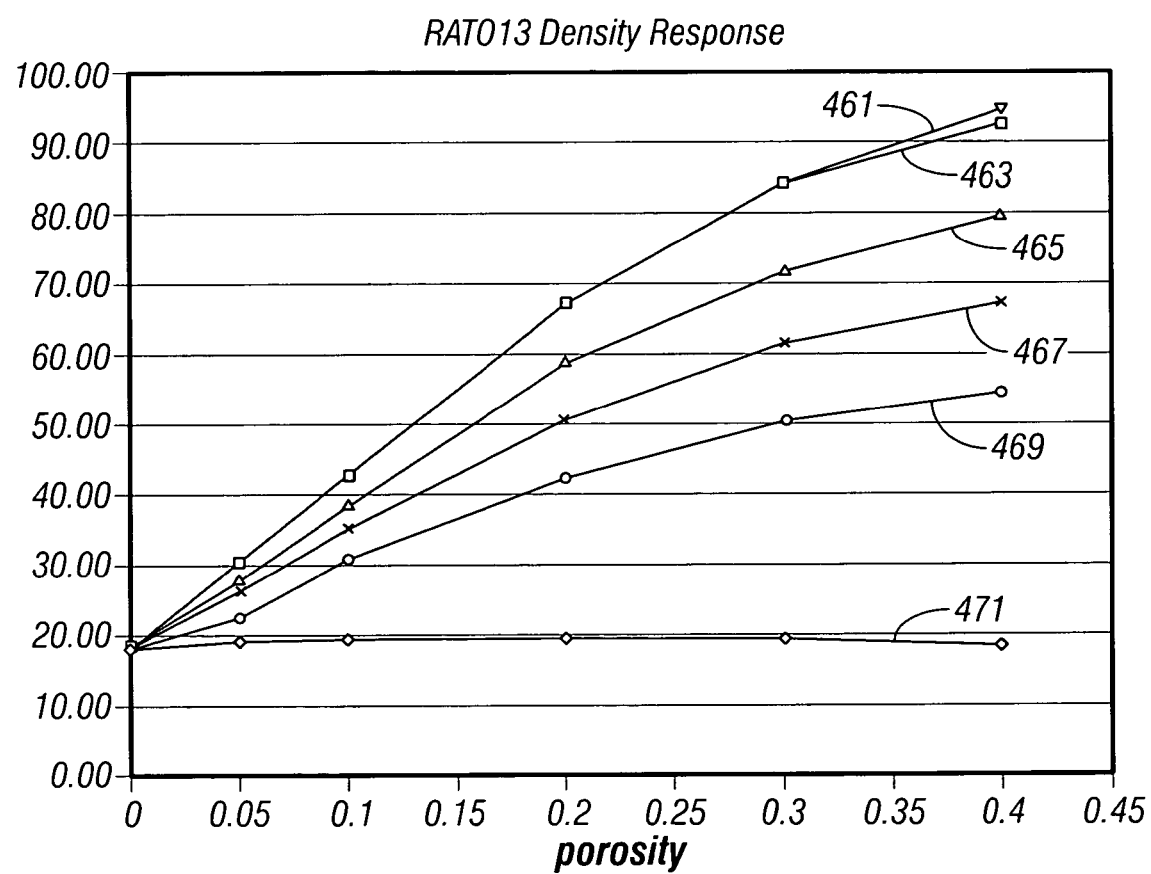
FIG. 14 shows the effect of oil density on the ratio of capture gamma ray counts for the near and extra-long spaced detector.

Turning now to FIG. 14, shown are plots of the ratio $R_{ATO13}$ of the capture gamma ray counts for the near and extra long spaced detector. The curve 461 corresponds to 100% water saturation while the curve 471 is for 100% gas saturation with a gas density of 0.1 gm/cm$^3$. Also shown in FIG. 13 are curves 463, 465, 467 and 469 for 100% saturation with oil having a density of 0.8, 0.7, 0.6 and 0.5 gm/cm$^3$ respectively.

Comparing FIG. 12 with FIG. 14, it is seen that the water line and oil at 0.8 gm/cc line are essentially the same. The chart for the $R_{ATO13}$ displays a clear, almost linear, response with oil density. By contrast it is obvious from the $R_{IN13}$ display that its response is primarily to the gas with a much reduced sensitivity to the liquid oil density. Both these charts have been produced from Monte-Carlo modeling of an 8.5 inch (21.6 cm) borehole with water filled 7 inch (17.8 cm) casing in a sandstone matrix. Thus, if the oil density is known (this is not expected to show much variation within a prospect), the relative oil-water saturation can be determined. Thus, we can define a FZP parameter for oil-water saturation as the ratio $R_{ATO13}$ in much the same way as the ratio $R_{IN13}$ defines a FZP parameter for gas-water saturation.

The methods described above are quantitative methods for determination of gas saturation and gas pressure. This is in contrast to prior art methods based on density determination that are effective in qualitatively identifying the presence of gas but have little value in quantitative analysis.

The neutron source and the gamma ray detectors may be conveyed into the cased borehole on a wireline. Alternatively, the conveyance may be done using a slickline. For a slickline conveyed embodiment, the data are stored on a suitable memory device and may be processed upon recovery of the memory device at the surface or a remote location.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks. The term processor is intended to include devices such as a field programmable gate array (FPGA).

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of evaluating an earth formation having a fluid mixture including oil and water therein, the method comprising:
   irradiating the earth formation with a pulsed neutron source, the source being disposed in a borehole;
   measuring radiation resulting from capture of thermal neutrons by nuclei in the earth formation at at least two detectors;
   determining from the measurements a value of a fluid zone parameter (FZP) indicative of an oil saturation $S_o$ at at least one depth in the borehole;
   defining a fluid zone parameter (FZP) as a ratio of capture gamma ray measurements made by one of the at least two detectors to capture gamma ray measurements made by another of the at least two detectors;
   establishing values of the FZP for at least two different values of $S_o$; and
   estimating from the determined value of the FZP and the at least two established values of FZP a value of $S_o$, the estimation being made without using any other radiation measurement.

2. The method of claim 1 wherein the borehole comprises a cased borehole.

3. The method of claim 1 wherein the at least two different values of $S_o$ comprise values substantially equal to 0.0 and substantially equal to 1.0.

4. The method of claim 1 wherein establishing the values of the FZP further comprises using at least one of (i) a formation mineralogy, (ii) a formation porosity, (iii) a tool response characteristic, (iv) a formation fluid density, (v) a borehole fluid density, (vi) a borehole diameter, (vii) a casing diameter, and (viii) an equation of state.

5. The method of claim 1 wherein establishing the values of the FZP further comprises a Monte Carlo simulation.

6. The method of claim 1 wherein the at least one depth further comprises a plurality of depths, the method further comprising displaying, at each of the plurality of depths, the determined value of the FZP and the established values of the FZP for the at least two different values of $S_o$.

7. The method of claim 1 wherein estimating the value of $S_o$ further comprises using at least one of (i) a linear interpolation, (ii) a nonlinear interpolation, (iii) a linear extrapolation, and (iv) a nonlinear extrapolation.

8. An apparatus configured to evaluate an earth formation having a fluid mixture including oil and water therein, the apparatus comprising:
   a source of pulsed neutrons conveyed in a borehole in the earth formation, the source configured to irradiate the earth formation;
   at least two detectors configured to produce signals indicative of results of capture of thermal neutrons by nuclei in the formation; and
   a processor configured to:
   (A) determine a fluid zone parameter (FZP) indicative of oil saturation $S_o$ as a ratio of capture gamma ray signals from the at least two detectors at at least one depth in the borehole,
   (B) establish values of the FZP for at least two different values of $S_o$; and
   (C) estimate from the determined value of the FZP and the at least two established values of FZP a value of $S_o$ without using any other radiation measurement.

9. The apparatus of claim 8 wherein the borehole comprises a cased borehole.

10. The apparatus of claim 8 wherein the at least two different values of $S_o$ comprise values substantially equal to 0.0 and substantially equal to 1.0.

11. The apparatus of claim 8 wherein the processor is configured to establish the values of the FZP using at least one of (i) a formation mineralogy, (ii) a formation porosity, (iii) a tool response characteristic, (iv) a formation fluid density, (v) a borehole fluid density, (vi) a borehole diameter, (vii) a casing diameter, (viii) a gas density, and (ix) an equation of state.

12. The apparatus of claim 8 wherein the processor is configured to establish the values of the FZP at least in part by using a Monte Carlo simulation.

13. The apparatus of claim 8 wherein the at least one depth further comprises a plurality of depths, and wherein the processor is further configured to display, at each of the plurality of depths, the determined value of the FZP and the established values of the FZP for the at least two different values of $S_o$.

14. The apparatus of claim 8 further comprising a conveyance device which is configured to convey the source of radiation into the borehole, the conveyance device selected from the group consisting of (i) a wireline, and (ii) a slickline.

15. The apparatus of claim 8 wherein the at least two detectors are configured to be responsive to gamma radiation.

16. A machine readable medium accessible to a processor, the machine-readable medium including instructions which enable the processor to:
   determine, as a ratio of signals of capture gamma rays from at least two detectors a value of a fluid zone parameter (FZP) indicative of an oil saturation $S_o$ at at least one depth in a borehole:
   establish values of the FZP for at least two different values of $S_o$; and
   estimate from the determined values of the FZP and the at least two established values of FZP a value of $S_o$ without using any other radiation measurement:
   wherein the signals are indicative or results of capture of thermal neutrons by nuclei in an earth formation responsive to pulsed neutrons generated by a source of pulsed neutrons in the borehole.

17. The medium of claim 16 further comprising at least one of:
   (i) a ROM, (ii) an EPROM, (iii) an EEPROM, (iv) a Flash Memory, and (v) an optical disk.

* * * * *